(12) United States Patent
Zhou

(10) Patent No.: US 6,254,957 B1
(45) Date of Patent: Jul. 3, 2001

(54) REWRITABLE OPTICAL INFORMATION MEDIUM

(75) Inventor: Guo-Fu Zhou, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/294,858

(22) Filed: Apr. 20, 1999

(30) Foreign Application Priority Data

Apr. 20, 1998 (EP) .................................................. 98201259

(51) Int. Cl.$^7$ ...................................................... B32B 3/02
(52) U.S. Cl. ........................ 428/64.1; 428/64.5; 428/64.6; 428/457; 428/913; 430/270.13; 430/495.1; 430/945; 369/283; 369/288
(58) Field of Search .................................. 428/64.1, 64.2, 428/64.4, 64.5, 64.6, 457, 698, 913; 430/270.13, 495.1, 945; 369/283, 288

(56) References Cited

U.S. PATENT DOCUMENTS

| 5,863,702 | * | 1/1999 | Obayashi | 430/270.13 |
| 5,965,229 | * | 10/1999 | Zhou | 428/64.4 |
| 6,087,067 | * | 7/2000 | Kato | 430/270.13 |
| 6,103,330 | * | 8/2000 | Kosuda | 428/64.1 |

OTHER PUBLICATIONS

PHN 16,184 (Ser. No. 08/993,133).
PHN 16,586 (Ser. No. 09/184,529).

* cited by examiner

Primary Examiner—Elizabeth Evans

(57) ABSTRACT

A rewritable optical information medium includes a substrate coated with two carbide layers, a phase-change recording layer between two carbide layers, and a light-absorptive layer of a material like Si, Ge, Mo, or W to slow the cooling when scanned with laser light so that the medium can be used for high data rate recording. The material is capable of a user data bit rate of 50 Mbit/s.

16 Cl"aims, 2 Drawing Sheets

REWRITABLE OPTICAL INFORMATION MEDIUM

FIELD OF THE INVENTION

The invention relates to the field of rewritable phase-change type optical recording media.

BACKGROUND OF THE INVENTION

The invention relates to an optical information medium for erasable recording using a laser-light beam, the medium including a substrate carrying a stack of layers includes a first and a second carbide layer, a recording layer of a phase-change material arranged between the carbide layers, for recording amorphous bits when in its crystalline state, and a first dielectric layer arranged between the substrate and the first carbide layer.

The invention also relates to the use of such an optical recording medium in high storage density and high data rate applications.

Optical information or data storage based on the phase change principle is attractive, because it combines the possibilities of direct overwrite (DOW) and high storage density with easy compatibility with read-only systems. Phase-change optical recording involves the formation of submicrometer-sized amorphous recording marks in a thin crystalline film using a focused laser-light beam. During recording information, the medium is moved with respect to the focused laser-light beam which is modulated in accordance with the information to be recorded. Due to this, quenching takes place in the phase-change recording layer and causes the formation of amorphous information bits in the exposed areas of the recording layer which remains crystalline in the unexposed areas. Erasure of written amorphous marks is realized by recrystallizing through heating with the same laser. The amorphous marks represent the data bits, which can be reproduced via the substrate by a low-power focused laser-light beam. Reflection differences of the amorphous marks with respect to the crystalline recording layer bring about a modulated laser-light beam which is subsequently converted by a detector into a modulated photocurrent in accordance with the coded, recorded digital information.

The main problems in high speed phase-change optical recording related to the required capability for a large number of overwrite cycles (cyclability), i.e. the number of repeated writing (amorphization) and erasing (recrystallization) operations, and a proper crystallization speed. A high crystallization speed is particularly required in high-density recording and high data rate applications, such as disc-shaped DVD-RAM, DVD-ReWritable, DVR (Digital Video Recorder) and optical tape, where the complete crystallization time (complete erase time: CET) has to be shorter than 50 ns. If the crystallization speed is not high enough to match the linear velocity of the medium relative to the laser-light beam, the old data (amorphous marks) of the previous recording cannot be completely removed (recrystallized) during DOW. This will cause a high noise level.

An optical information medium of the type mentioned in the opening paragraph is described in co-pending U.S. patent application 08/993,133 filed Dec. 18, 1997. The described medium of the phase-change type includes a substrate carrying a stack of layers including a first dielectric layer of e.g. $(ZnS)_{80}(SiO_2)_{20}$, a phase change recording layer of e.g. a GeSbTe compound, which recording layer is sandwiched between two relatively thin carbide layers of e.g. SiC, a second dielectric layer, and a reflective layer. Such a stack of layers can be referred to as an $I_1I^+PI^+I_2M$ structure, wherein M represents a reflective or mirror layer, $I_1$ and $I_2$ represent the first and second dielectric layer respectively, $I^+$ represents a carbide layer, and P represents a phase-change recording layer. With such a stack, a CET value of 25 to 30 ns is reported. A CET value of 28 ns corresponds to a user data bit rate (UDBR) of 35 Mbit/s, or a data bit rate (DBR) of 41 Mbit/s. UDBR is DBR corrected for overhead, i.e. data used for addressing codes and error correction.

The above citations are hereby incorporated in whole by reference.

SUMMARY OF THE INVENTION

A higher UDBR value needs a shorter CET, e.g. a UDBR of 50 Mbit/s needs a CET of 20 ns. However, such a short CET is difficult to obtain.

It is an object of the invention to provide, inter alia, a rewritable optical information medium which is suitable for high speed optical recording, such as DVD-RAM, DVD-ReWritable and DVR and optical tape, having a UDBR of more than 35 Mbit/s, e.g. 50 Mbit/s, without the need to lower the CET. High speed recording is to be understood to mean in this context a linear velocity of the medium relative to the laser-light beam of at least 7.2 m/s, e.g. 18.3 m/s which is fifteen times the speed according to the Compact Disc standard. The jitter of the medium should be at a low, constant level. Moreover, the medium should have a good cyclability.

These objects are achieved in accordance with the invention by an optical information medium as described in the opening paragraph, in which a light-absorptive layer is arranged between the second carbide layer and a metal mirror layer and/or a second dielectric layer, causing the quantity of laser-light absorbed in the recording layer in the crystalline state to be higher than in the amorphous state. In optical recording media as described in the prior art, such as media having IPIM stacks, the quantity of laser-light absorbed in the recording layer in the crystalline state ($A_c$) is lower than in the amorphous state ($A_a$). When a light-absorptive layer is added to the stack, so that $A_c$ is higher than $A_a$, it is found that a higher data rate can be obtained. When $A_c > A_a$, the crystalline portion of the recording layer is heated to a higher temperature than the amorphous marks when the recording layer is irradiated with laser light having a given pulse duration (dwell time). For erasing an amorphous mark, the temperature must be maintained above the crystallization temperature $T_x$ for a time t which is at least the CET value. Because the crystalline background will obtain a higher temperature than that of an amorphous mark to be erased, heat will diffuse to the mark, as a result of which the mark will cool down at a lower rate (slow cooling disc structure) and will remain above $T_x$ for a longer time. Because of the slow cooling disc structure, the amorphous marks can stay at a temperature above $T_x$ for a time t equal or longer than CET, using the same dwell time. With a disc structure having a light absorptive layer according to the invention, a higher data rate is achieved, without lowering CET. In contrast to this, a stack in which $A_c$ is lower than $A_a$ would result in a fast cooling disc structure, i.e. the crystalline background would have a lower temperature than an amorphous mark. Heat will then diffuse from the mark to the crystalline background. With the same dwell time and power, the time t during which the mark is above $T_x$ would be shorter than CET; the amorphous mark will not be erased completely.

The optical information medium according to the invention may have a stack of the following structure: $I_1I^+PI^+AM$ (FIG. 2) or $I_1I^+PI^+AI_2$ (FIG. 3), in which A is the light-absorptive layer, and $I_1$ and $I_2$, $I^+$, P and M have the above meaning. Preferred is the structure in which both a second dielectric layer $I_2$ and M are present: $I_1I^+PI^+I_2AM$ (FIG. 5) or $I_1I^+PI^+AI_2M$ (FIG. 1). In the latter structure the second dielectric layer $I_2$ avoids alloying between A and M.

Preferred are the stacks in which a third dielectric layer 13 is arranged between the light-absorptive layer and the second carbide layer. Such a third dielectric layer can be used to optimise the thermal properties of the stack, and to avoid alloying between the second carbide layer and the light-absorptive layer. These stacks have the structure: $I_1I^+PI^+I_3AI_2M$ (FIG. 4) and $I_1I^+PI^+I_3AI_2$ (FIG. 6).

In a preferred embodiment the material of the light-absorptive layer has a n/k ratio of 0.5 to 20, preferably 0.6 to 16, in which n is the refractive index and k is the extinction coefficient. These values give a proper balance between light absorption and transmission. Examples of materials which satisfy these conditions are metals selected from the group consisting of Mo, W, Pd, Pt, Co, Ni, Mn, Ta, Cr, Ti and Hf, and semiconducting materials selected from the group consisting of PbS, Ge, InP and Si. Preferred are Si and Ge, because they are cheap and easy to apply.

The first and second carbide layers on both sides of the recording layer are made of a transparent material having a high enthalpy of formation. The high enthalpy of formation makes the material very stable, so it will not decompose at the high write temperatures. The stack of a recording medium is subjected to a thermoshock, i.e. the sudden increase and decrease of the temperature during writing, which would limit the cyclability. In particular, the chemical decomposition at high temperature of the dielectric layers adjacent the recording layer and diffusion of atoms into the recording layer affects the recording layer, resulting in deterioration of the quality of the written marks. This problem is mitigated when the layers adjacent to the recording layer are carbides. The carbide layer thus provides a very high cyclability. Moreover, the carbide layer yields a high crystallisation speed of the recording layer, while keeping the write power of the laser beam at a relatively low level. The carbide layer must be combined with a dielectric layer of another material, here the first dielectric layer, because a stack having a single layer of carbide between the recording layer and the substrate cannot realize the desired thermal properties.

The carbide of the carbide layers is preferably a member of the group SiC, ZrC, TaC, TiC, WC, which combine an excellent cyclability with a short crystallisation time. SiC is a preferred material because of its optical, mechanical and thermal properties; moreover, its price is relatively low.

The first, second and third dielectric layers are preferably made of a mixture of ZnS and $SiO_2$, e.g. $(ZnS)_{80}(SiO_2)_{20}$. The layers may also be made of $SiO_2$, $TiO_2$, ZnS, $Si_3N_4$, AlN and $Ta_2O_5$.

For the metal mirror layer, metals such as Al, Ti, Au, Ni, Cu, Ag, Rh, Pt, Pd, Ni, Co, Mn and Cr, and alloys of these metals, can be used. Examples of suitable alloys are AlTi, AlCr and AlTa.

The recording layer preferably contains a GeSbTe compound. Especially useful are the compounds described in the international patent application WO 97/50084 (PHN 15881) filed by Applicants. These compounds have a composition defined in atomic percentages, by the formula: $Ge_{50x}Sb_{40-40x}Te_{60-10x}$, wherein $0.166 \leq x \leq 0.444$.

These compositions are situated on the line connecting the compounds GeTe and $Sb_2Te_3$ in the triangular Ge—Sb—Te composition diagram, and include the stoichiometric compounds $Ge_2Sb_2Te_5$ (x=0.445), $GeSb_2Te_4$ (x=0.286) and $GeSb_4Te_7$ (x=0.166). These compounds show a low CET-value.

Other preferred compounds are described in co-pending U.S. patent application Ser. No. 09/184,529, filed Nov. 2, 1998 hereby incorporated herein in whole by reference. These compounds have a composition defined by an area in the ternary composition diagram Ge—Sb—Te in atomic percentages, the area being of pentagonal shape having the following vertices:

| | |
|---|---|
| $Ge_{14.2}Sb_{25.8}Te_{60.0}$ | (P) |
| $Ge_{12.7}Sb_{27.3}Te_{60.0}$ | (Q) |
| $Ge_{13.4}Sb_{29.2}Te_{57.4}$ | (R) |
| $Ge_{15.1}Sb_{27.8}Te_{57.1}$ | (S) |
| $Ge_{13.2}Sb_{26.4}Te_{60.4}$ | (T); |

With these compounds CET-values below 50 ns can be achieved.

Other preferred compounds have a composition:

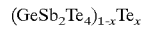

$$(GeSb_2Te_4)_{1-x}Te_x$$

wherein the molar fraction x satisfies: $0.01 \leq x \leq 0.37$. These compositions are situated on the tie-line connecting $GeSb_2Te_4$ and Te in the ternary composition diagram, but within the pentagonal area PQRST. With these compounds CET-values of lower than 45 ns can be obtained.

When up to 3.5 at. % oxygen is added to the above mentioned Ge—Sb—Te compounds, even lower CET-values are obtained.

The crystallization speed or CET-value of the above mentioned GeSbTe compounds depends on the layer thickness of the recording layer. The complete erase time CET is defined as the minimum duration of the erasure laser pulse for complete crystallization of a written amorphous mark in a crystalline environment. CET decreases rapidly as the layer thickness increases up to 10 nm. When the recording layer is thicker than 25 nm, CET is essentially independent of thickness. Above 35 nm the cyclability of the medium is adversely affected. The cyclability of the medium is measured by the relative change of the optical contrast after a large number of DOW-cycles, e.g $10^5$. In every cycle the written amorphous bits are erased by recrystallizing through heating with a laser-light beam while the new amorphous marks are written. In the ideal case, the optical contrast remains unchanged after cycling. The cyclability is practically constant up to a layer thickness of the recording layer of 35 nm. As a result of the combined demands regarding CET and cyclability, the thickness of the recording layer should range between 10 and 35 nm, preferably between 20 and 35 nm, more preferably between 25 and 35 nm. A medium having a recording layer with a thickness between 25 and 35 nm has a constant low jitter during the first $10^5$ DOW-cycles. The presence of carbide layers on both sides of the recording layer causes the thickness dependence of CET to shift to thinner layers. The saturation value of CET is then shifted to 25 to 30 ns.

The distance between the substrate and the recording layer is preferably between 70 and $[70+\lambda/(2n)]$ nm, wherein $\lambda$ is the wavelength of the laser-light beam, and n is the equivalent refractive index of the layers between the substrate and the recording layer. The equivalent refractive index is used when the dielectric layers have different refractive indices. The distance equals the total thickness of the dielectric layers between the substrate and the recording layer, and includes the thicknesses of the first dielectric layer and the first carbide layer. If the distance is smaller than 70 nm, the cyclability is reduced considerably. A distance larger than 70+$\lambda$/(2n) nm does not increase the cyclability further, adversely affects the optical contrast, and is more expensive to make. If, for example, the wavelength is equal to 630 nm and the refractive index is 1.5, the thickness range extends from 70 nm to 280 nm.

The distance between the recording layer and the metal mirror layer is at least 20 nm. This distance equals the total thickness of the dielectric layers between the recording layer and the metal mirror layer, and includes the thicknesses of the second carbide layer, the second dielectric layer, the third dielectric layer (if present), and the light-absorptive layer. When this distance is too small, the thermal insulation between the recording layer and the metal mirror layer is adversely affected. As a result, the cooling rate of the recording layer is increased, and, consequently, an undesirable increase in the write power occurs. The cooling rate will be decreased by increasing this distance.

The thickness of the light-absorptive layer is between 5 and 100 nm, in order to have a proper balance between light absorption and transmission, and depends on the n/k ratio of the material chosen. For example for Si the thickness is about 65 nm, whereas for W and Mo the thickness is about 40 nm.

The thickness of the first and the second carbide layer is preferably between 2 and 8 nm. The relatively high thermal conductivity of the carbide will only have a small effect on the stack when this thickness is small, thereby facilitating the thermal design of the stack. The advantageous effects of the carbide layers on the cyclability are maintained within the thickness range.

Both the reflective mirror layer, the carbide layers, and the dielectric layers can be provided by vapour deposition or sputtering.

The substrate of the information medium is at least transparent to the laser wavelength, and is made, for example, of polycarbonate, polymethyl methacrylate (PMMA), amorphous polyolefin or glass. In a typical example, the substrate is disc-shaped and has a diameter of 120 mm and a thickness of 0.1, 0.6 or 1.2 mm. When a substrate of 0.6 or 1.2 mm is used, the layers can be applied on this substrate starting with the first dielectric layer, first carbide layer, recording layer, etc. The laser-light beam enters the stack via the entrance face of the substrate. The layers of the stack on the substrate may also be applied in the reversed order, i.e. starting with the metal mirror layer. The last dielectric layer is then provided with a transparent layer from one of the above mentioned substrate materials with a thickness of 0.1 mm. The laser-light beam enters the stack via the entrance face of this transparent layer.

Alternatively, the substrate may be in the form of a synthetic resin flexible tape, made e.g. from a polyester film. In this way an optical tape will be obtained for use in an optical tape recorder, which is for example based on a fast spinning polygon. In such a device the reflected laser-light beam makes transverse scans across the tape surface.

The surface of the disc-shaped substrate on the side of the recording layer is, preferably, provided with a servotrack which can be scanned optically. This servotrack is often constituted by a spiral-shaped groove and is formed in the substrate by a mould during injection moulding or pressing. This groove can be alternatively formed in a replication process in a synthetic resin layer, for example, a UV light-cured layer of acrylate, which is separately provided on the substrate. In high-density recording such a groove has a pitch e.g. of 0.5–0.8 $\mu$m and a width of about half the pitch.

Optionally, the outermost layer of the stack is screened from the environment by a protective layer of, for example, UV light-cured poly(meth)acrylate.

High-density recording and erasing can be achieved by using a short-wavelength laser, e.g. with a wavelength of 675 nm or shorter (red to blue).

The phase change recording layer can be applied to the substrate by vacuum deposition, electron beam vacuum deposition, chemical vapour deposition, ion plating or sputtering. The layer as deposited is amorphous and exhibits a low reflection. In order to constitute a suitable recording layer having a high reflection, this layer must first be completely crystallized, which is commonly referred to as initialization. For this purpose, the recording layer can be heated in a furnace to a temperature above the crystallization temperature of the GeSbTe compound, e.g. 180° C. A synthetic resin substrate, such as polycarbonate, can alternatively be heated by a laser-light beam of sufficient power. This can be realized, e.g. in a recorder, in which case the laser-light beam scans the moving recording layer. The amorphous layer is then locally heated to the temperature required for crystallizing the layer, without the substrate being subjected to a disadvantageous heat load.

Those skilled in the art will understand the invention and additional objects and advantages of the invention by studying the description of preferred embodiments below with reference to the following drawings which illustrate the features of the appended claims:

DETAILED DESCRIPTION OF THE PREFERRED EMBODIMENT

Exemplary Embodiment 1.

Figure 1:
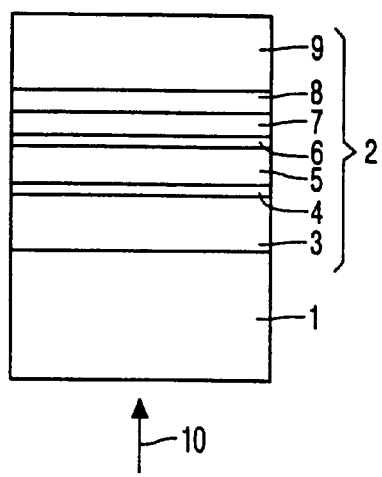
FIG. 1 shows a schematic cross-sectional view of an optical information medium in accordance with the invention with a stack having a $I_1I^+PI^+AI_2M$ structure.

FIG. 1 schematically shows a part of a cross-section of an optical information disc in accordance with the invention. Reference numeral 1 denotes a polycarbonate disc-shaped substrate having a diameter of 120 mm and a thickness of 0.6 mm. The substrate 1 is provided with a $I_1I^+PI^+AI_2M$ stack 2 of the following structure:

first dielectric layer 3 of $(ZnS)_{80}(SiO_2)_{20}$ with a thickness of 225 nm ($I_1$), first silicon carbide layer 4 with a thickness of 5 nm ($I^+$), recording layer 5 of an alloy of GeSbTe with a thickness of 27 nm (P),
second carbide layer 6 with a thickness of 5 nm (I$^+$),
light-absorptive layer 7 of silicon (Si) with a thickness of 65 nm (A),
second dielectric layer 8 of $(ZnS)_{80}(SiO_2)_{20}$ with a thickness of 20 nm (I$_2$),
metal mirror layer 9 of Al with a thickness of 100 nm (M).

All the layers are provided by sputtering. The composition of the recording layer 5 is in atomic percentages: $Ge_{13.75}Sb_{27.40}Te_{58.85}$.

The initial crystalline state of the recording layer 5 is obtained by heating the as-deposited amorphous alloy with a focused laser beam in a recorder.

A laser-light beam for recording, reproducing and erasing of information enters the stack 2 via the substrate 1. This beam is schematically represented by arrow 10. The amorphous marks are written with a single laser pulse of power $P_w=1.25\ P_m$ ($P_m$=melting threshold power) and duration 100 ns. The erase power is $P_w/2$.

The CET value of the recording layer 5 in stack 2 is about 28 ns, which is equal to a stack without the light-absorptive layer 7. The user data bit rate (UDBR) amounts to 50 Mbit/s (data bit rate DBR is 61 Mbit/s), whereas the UDBR of a stack without the light-absorptive layer 7 is 35 Mbit/s (DBR is 41 Mbit/s). The addition of the light-absorptive layer 7, resulting in a slow cooling structure of the stack, allows a higher data bit rate, whereas the CET remains unchanged.

The number of overwrite cycles before deterioration of the medium becomes noticeable (i.e cyclability) is $1.2 \times 10^5$. The cyclability is measured as the number of rewrite cycles where the jitter has increased to 12% of the clock time $T_c$, i.e. 28 ns at CD speed (1.2 m/s; clock time 230 ns). The jitter is the standard deviation of the difference between the leading and trailing edges in the information signal and the data clock recovered from the information signal.

With a DBR of 61 Mbits/s (UDBR 50 Mbits/s) and a channel bit length of 0.3 μm, a relative linear velocity between the laser beam and the medium of 18.3 m/s is possible, i.e. 15 times the CD speed of 1.2 m/s.

Exemplary Embodiments 2 to 6.

Further embodiments of recording media according to the invention are shown in FIGS. 2 to 6. In these Figures the reference numerals have the same meaning as those in FIG. 1 of exemplary embodiment 1.

Figure 2:
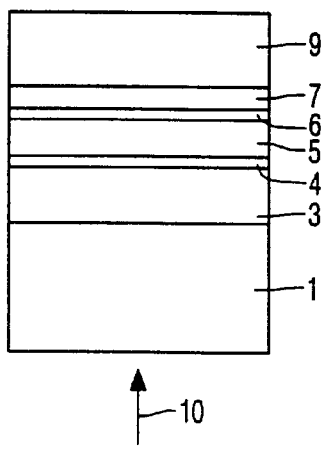
FIG. 2 shows a schematic cross-sectional view of an optical information medium in accordance with the invention with a stack having a $I_1I^+PI^+AM$ structure.

FIG. 2 shows a medium with a stack having the structure I$_1$I$^+$PI$^+$AM, i.e. it differs from FIG. 1 in that the second dielectric layer 8 (I$_2$) has been omitted. This stack can be used if the material of the light-absorptive layer 7 has a high melting point, such as Mo and W.

Figure 3:
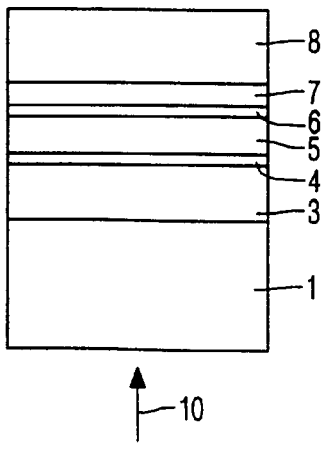
FIG. 3 shows a schematic cross-sectional view of an optical information medium in accordance with the invention with a stack having a $I_1I^+PI^+AI_2$ structure.

FIG. 3 shows a medium with a stack having the structure I$_1$I$^+$PI$^+$AI$_2$, i.e. it differs from FIG. 1 in that the metal mirror layer 9 (M) has been omitted. This stack can be used if the material of the light-absorptive layer 7 (A) has a small k value.

Figure 4:
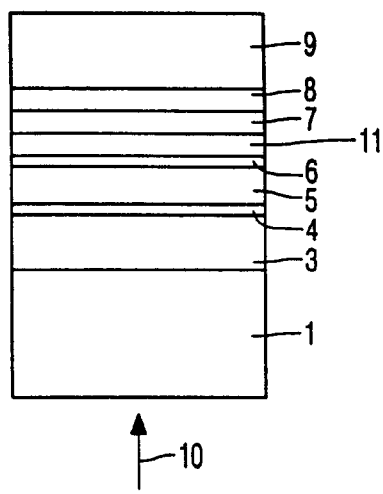
FIG. 4 shows a schematic cross-sectional view of an optical information medium in accordance with the invention with a stack having a $I_1I^+PI^+I_3AI_2M$ structure.

FIG. 4 shows a medium with a stack having the structure I$_1$I$^+$PI$^+$I$_3$AI$_2$M, i.e. it differs from FIG. 1 in that a third dielectric layer 11 (I$_3$) is arranged between the second carbide layer 6 (I$^+$) and the light-absorptive layer 7 (A).

Figure 5:
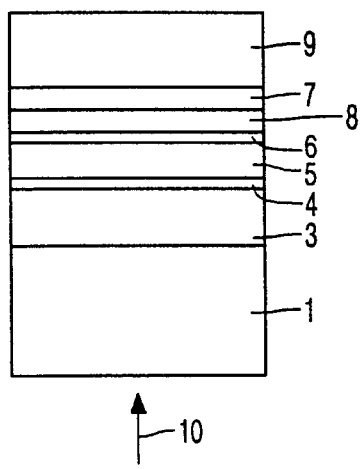
FIG. 5 shows a schematic cross-sectional view of an optical information medium in accordance with the invention with a stack having a $I_1I^+PI^+I_2AM$ structure.

FIG. 5 shows a medium with a stack having the structure I$_1$I$^+$PI$^+$I$_2$AM, i.e. it differs from FIG. 1 in that the sequence of the light-absorptive layer 7 (A) and the second dielectric layer 8 (I$_2$) has been reversed.

Figure 6:
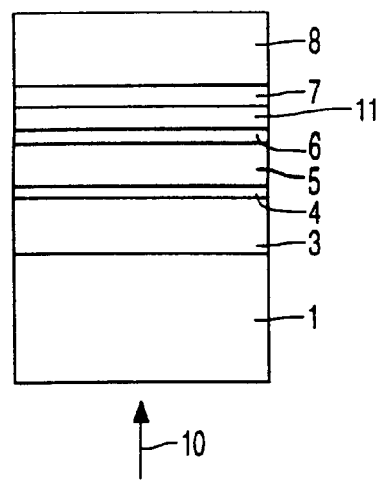
FIG. 6 shows a schematic cross-sectional view of an optical information medium in accordance with the invention with a stack having a $I_1I^+PI^+I_3AI_2$ structure.

FIG. 6 shows a medium with a stack having the structure I$_1$I$^+$PI$^+$I$_3$AI$_2$, i.e. it differs from FIG. 4 in that the metal mirror layer 9 (M) has been omitted.

According to the invention a rewritable phase change optical information medium is provided, such as DVD-RAM, DVR or optical tape, which is suitable for direct overwrite and high-speed recording, with a good cyclability and a low jitter at a linear velocity of 7.2 m/s or more. A user data bit rate of 50 Mbit/s is obtained.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. A rewritable optical information medium, comprising:
   a substrate
   a first and a second carbide layer on the substrate;
   recording means including a recording layer of a phase-change material between the first and second carbide layers, for recording amorphous bits when in a crystalline state;
   a first dielectric layer between the substrate and the first carbide layer;
   a further layer selected from a metal mirror layer, and a dielectric layer;
   a light-absorptive layer between the second carbide layer and the further layer and having means for causing a quantity of laser-light absorbed in the recording layer in the crystalline state to be higher than in the amorphous state when the medium is scanned by the laser-light beam.

2. The medium of claim 1, in which the further layer is metal mirror layer and the medium further comprises a second dielectric layer between the metal mirror layer and the light-absorptive layer.

3. The medium of claim 1, in which the light-absorptive layer includes a material selected from a group of metals consisting of Mo, W, Pd, Pt, Co, Ni, Mn, Ta, Cr, Ti and Hf, or a group of semiconducting materials consisting of PbS, Ge, InP and Si.

4. The medium of claim 1, in which the light-absorptive layer has a thickness between 5 and 100 nm.

5. The medium of claim 1, in which the carbide of the carbide layers is selected from the group consisting of SiC, ZrC, TaC, TiC, and WC.

6. The medium of claim 1, in which the recording layer includes a GeSbTe compound.

7. The medium of claim 1, in which the recording layer has a thickness from 10 to 35 nm.

8. The medium of claim 1, in which the distance between the substrate and the recording layer is between 70 and $[70+\lambda/(2n)]$ nm, wherein $\lambda$ is the wavelength of the laser-light beam, and n is the equivalent refractive index of the layers between the substrate and the recording layer.

9. The medium of claim 1, in which the distance between the recording layer and the metal mirror layer is at least 20 nm.

10. The medium of claim 1, in which the recording layer has a thickness from 25 to 35 nm.

11. The medium of claim 1, further comprising a third dielectric layer between the light-absorptive layer and the second carbide layer.

12. The medium of claim 2, further comprising a third dielectric layer between the light-absorptive layer and the second carbide layer.

13. The medium of claim 1, in which:
   the further layer is metal mirror layer and the medium further comprises a second dielectric layer between the metal mirror layer and the light-absorptive layer;

the medium further comprises a third dielectric layer between the light-absorptive layer and the second carbide layer;

the light-absorptive layer includes a material selected from a group of metals consisting of Mo, W, Pd, Pt, Co, Ni, Mn, Ta, Cr, Ti and Hf, or a group of semiconducting materials consisting of PbS, Ge, InP and Si;

the light-absorptive layer has a thickness between 5 and 100 nm;

the carbide of the carbide layers is selected from the group consisting of SiC, ZrC, TaC, TiC, and WC;

the recording layer includes a GeSbTe compound;

the recording layer has a thickness from 10 to 35 nm the distance between the substrate and the recording layer is between 70 and $[70+\lambda/(2n)]$ nm, wherein $\lambda$ is the wavelength of the laser-light beam, and n is the equivalent refractive index of the layers between the substrate and the recording layer; and the distance between the recording layer and the metal mirror layer is at least 20 nm.

14. A method of high-speed recording, comprising the steps of:

providing a medium including the steps of: providing a substrate; providing a first and a second carbide layer on the substrate; providing a recording means including a recording layer of a phase-change material, between the first and second carbide layers, for recording amorphous bits when in a crystalline state providing a first dielectric layer between the substrate and the first carbide layer; and providing a light-absorptive layer atop the second carbide layer; and scanning the recording layer with a laser-light beam in which a relative velocity between the laser-light beam and the medium is at least 7.2 m/s.

15. The method of claim 14, in which:

providing the recording layer includes providing a layer with a thickness from 25 to 35 nm.

16. The method of claim 14, in which:

providing the further layer includes providing a metal mirror layer and the method further comprises providing a second dielectric layer between the metal mirror layer and the light-absorptive layer;

the method further comprises providing a third dielectric layer between the light-absorptive layer and the second carbide layer;

providing the light-absorptive layer includes selecting a material from a group of metals consisting of Mo, W, Pd, Pt, Co, Ni, Mn, Ta, Cr, Ti and Hf, or from a group of semiconducting materials consisting of PbS, Ge, InP and Si, and including the selected material in the light-absorbing layer;

providing the light-absorptive layer includes providing it with a thickness between 5 and 100 nm;

providing the carbide layers includes selecting a carbide from the group consisting of SiC, ZrC, TaC, TiC, and WC and including the selected carbide in the carbide layer;

providing the recording layer includes providing a GeSbTe compound in the recording layer;

providing the recording layer includes providing a layer with a thickness from 10 to 35 nm the distance between the substrate and the recording layer is between 70 and $[70+\lambda/(2n)]$ nm, wherein $\lambda$ is the wavelength of the laser-light beam, and n is the equivalent refractive index of the layers between the substrate and the recording layer; and the distance between the recording layer and the metal mirror layer is at least 20 nm.

* * * * *